Figure 1:
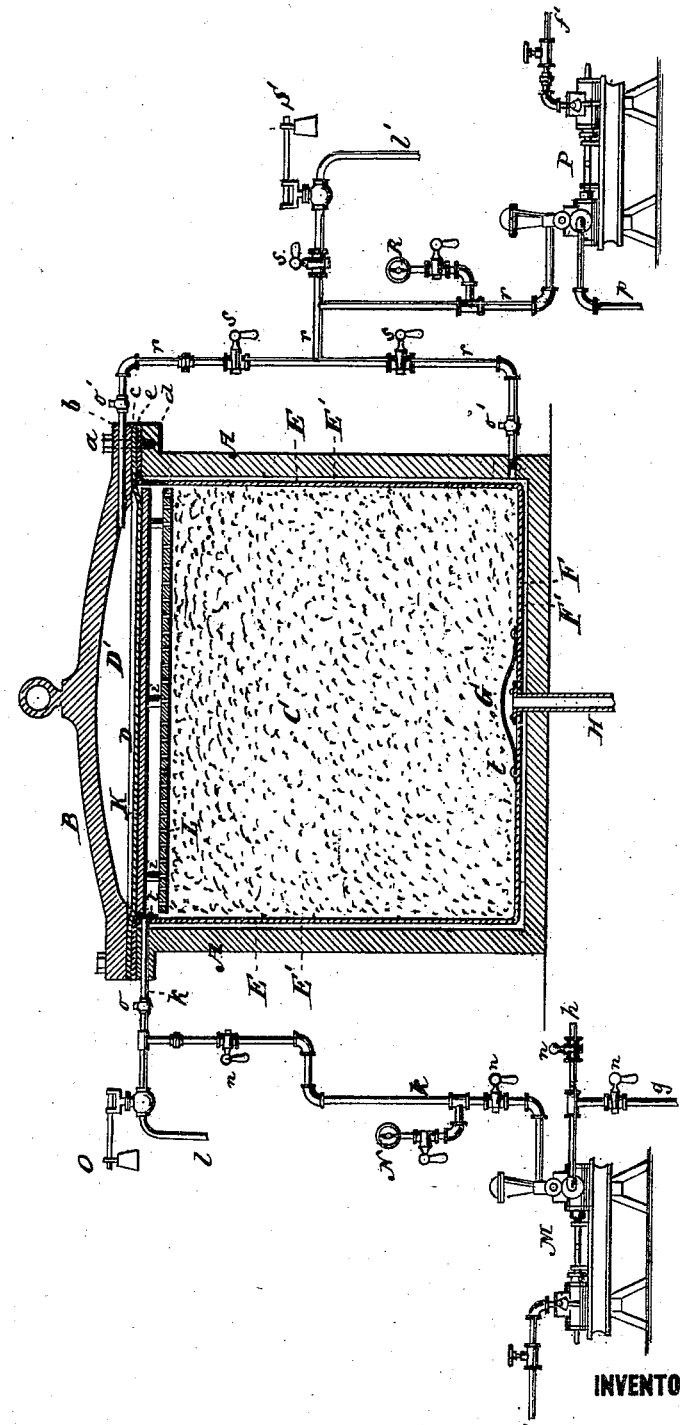

3 Sheets—Sheet 1.

T. R. SINCLAIRE.
APPARATUS FOR FILTERING LIQUID.

No. 183,424. Patented Oct. 17, 1876.

WITNESSES:
E. Wolff.
Wm F. Pickett

INVENTOR:
BY Thos R Sinclaire

ATTORNEYS.

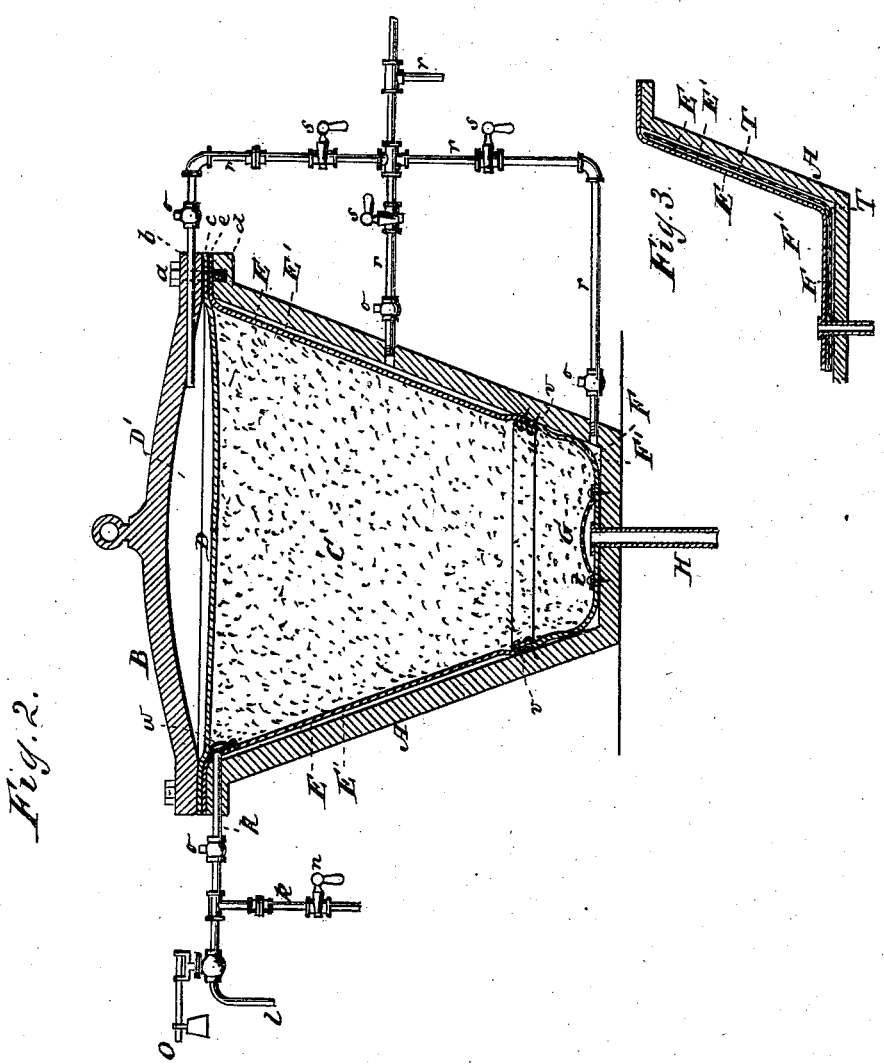

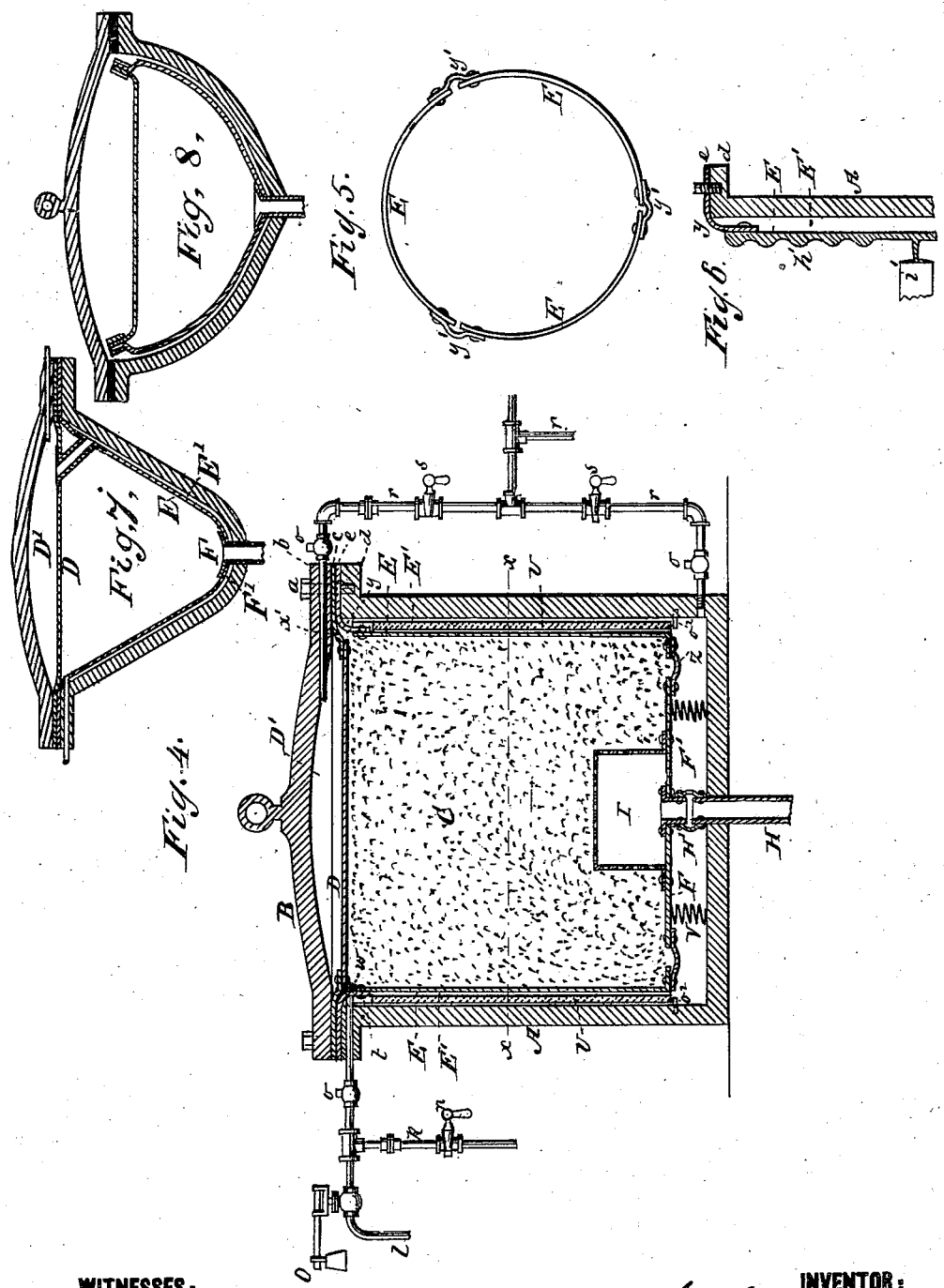

UNITED STATES PATENT OFFICE

THOMAS R. SINCLAIRE, OF NEW YORK, N. Y., ASSIGNOR TO SINCLAIRE RECTIFYING MACHINE COMPANY, OF SAME PLACE.

IMPROVEMENT IN APPARATUS FOR FILTERING LIQUIDS.

Specification forming part of Letters Patent No. 183,424, dated October 17, 1876; application filed August 18, 1876.

*To all whom it may concern:*

Be it known that I, THOMAS R. SINCLAIRE, of the city of New York, in the county and State of New York, have invented certain Improvements in Apparatus for Filtering Liquids, of which the following is a full, clear, and exact description.

This invention relates to certain improvements in the construction of apparatus for filtering liquids, whereby the liquid to be filtered is caused to percolate the body or mass of the filtering material, and thereby become properly filtered before reaching the place of discharge; and in certain novel combinations of parts, which will be hereafter fully described and explained.

In Figure 1, A represents the filtering-vessel, which may be cylindrical, square, conical, or tapering, or of any other suitable shape or form, and B designates the cover thereof, which is shown as secured to the vessel A by screw-bolts *a* passing through the cover-flange *b* and into the vessel-flange *d*, a suitable packing being interposed between said flanges. D designates an impervious movable or adjustable liquid-tight diaphragm extending across the upper part of the vessel A and between the cover and vessel flanges *b d*, as shown at *c*, thus forming a liquid-tight chamber, D'. E designates an impervious movable or adjustable liquid-tight diaphragm extending along the sides of the vessel A and between the flanges *b d*, as shown at *e*. Thus it will be seen that the material used for the diaphragms D or E may also constitute the packing between the cover and vessel flanges *b d*. F designates an impervious movable or adjustable liquid-tight diaphragm extending along the bottom of the vessel A and joined to the diaphragm E, and also to the exit-pipe or outlet H. K designates a plate or support for the diaphragm D, which plate K, in the present instance, is shown as being impervious. L designates another plate, which is shown as being pervious or perforated, and as resting upon the filtering material C. *i i* designate supports or cleats interposed between the plates K and L, thus leaving a space or chamber for the reception (through the pipe or orifice *k*) of the liquid to be filtered. G designates a pervious plate, diaphragm, or cap surrounding the orifice of the outlet or exit H, and is shown as secured to the diaphragm F by means of, say, pins *t*. Instead of using the cap G, the mouth of the orifice or pipe H could, of course, be made reticulated or permeable in any manner that would allow of the passage of the liquid, and retain or keep back the filtering material. H designates the exit or outlet pipe, which is shown as liquid-tight where it joins the diaphragm F. *k* designates a feed-pipe for the liquid to be filtered, and is shown as liquid-tight at its junction with the diaphragm E. Of course the feed-pipe *k* could, if desired, pass through the cover B and diaphragm D, and be provided with liquid-tight joints. M designates a force-pump, by means of which the liquid to be filtered is forced through the feed-pipe *k k*, and into and through the filtering material C in the vessel A. *f* is the steam-pipe of the pump M, while *g* is the suction-pipe leading to the liquid to be filtered, and *h* a suction-pipe leading to, say, water or steam for washing or cleaning the filtering material. N designates a pressure-gage for the guidance of the pressure to be used, and O a safety or overflow valve governing the degree of pressure required, while *l* is a pipe leading from the safety-valve O to any suitable receptacle, or to the tank or source whence the liquid to be filtered was drawn. *o* is a check-valve to prevent the back flow of the liquid, and *n n* are stop-cocks to be used in the ordinary manner. P designates a force-pump, by means of which pressure can be exerted through the pipes *r r r* upon the diaphragms D, E, and F. *f'* is the steam-pipe of the pump P, and *p* the suction-pipe leading to, say, the liquid, steam, or air for exerting the pressure upon the diaphragms D, E, and F. R designates a pressure-gage for the guidance of the pressure to be used, and S a safety or overflow valve governing the degree of pressure required, while *l'* is a pipe leading from the safety-valve S to any suitable receptacle. *o' o'* are check-valves, and *s s* are stop-cocks, all acting in the manner before described. Although I have shown two force-pumps, M and P, yet it is obvious that only one pump need be used, the said pump connecting with both feed-pipes $k$ and $r$, or the said pump may have a double water or liquid end of different diameters or bores for the purpose of creating a greater pressure through one feed-pipe than through the other, as circumstances may require; or, indeed, an elevated tank or reservoir, or any other suitable pressure-producing medium, could be used in connection with either of the feed-pipes or orifices $k$ or $r$, as found expedient. The diaphragms D, E, and F may be made of any suitable elastic, pliable, or flexible material, or may be made of any substance or substances which will admit of their being adjustable, yielding, or movable. In this figure (1) I have shown the said diaphragms as composed of india-rubber. And it will be seen by reference to this figure that, by means of the pipes or orifices $r$ $r$ and stop-cocks $s$ $s$, pressure can be exerted upon the diaphragm D alone, or upon the diaphragms E F alone, or upon all together; or, indeed, that different pressures can be exerted upon said diaphragms.

Having thus described this figure, (1,) the operation is as follows: The liquid to be filtered is introduced, by means of the pipe or orifice $k$, through the vessel A and diaphragm E, and distributed over the plate L, whence it percolates, through the filtering material C, toward and through the exit or outet pipe H. But in thus filtering under pressure it has been found that channels or grooves will be cut or formed between the filtering-vessel or walls of the filtering-chamber and the filtering material, leaving a passage-way for unfiltered liquid. Now, by reason of the pressure exerted behind or upon the diaphragms, E and F, the said diaphragms E and F can be forced or pressed against the filtering material in such manner as to prevent the formation of such channels or grooves, while the pressure exerted upon the diaphragm D and upon the plates K and L compresses the filtering material in such manner as to materally assist in this operation. Any degree of pressure may be exerted upon the diaphragm D or upon the diaphragms E and F, and the said pressure may be continuous, or, after obtaining the required amount, it may be shut off, all as found expedient. The spaces $E'$ and $F'$ designate the chambers or passage-ways formed by the pressure thus exerted, and filled with the liquid, steam, or air used for the purpose of exerting or maintaining such pressure.

In Fig. 2 I have shown the vessel A as conical or tapering. The advantage of thus constructing the filtering-vessel in combination with the impervious, flexible, movable or adjustable diaphragms is that the filtering material, by means of the external pressure exerted upon the diaphragm D, will be so forced or wedged against the diaphragms E and F (or against the sides and bottom of the filtering chamber when the diaphragms E and F are not used) as to greatly tend to prevent the formation of any channels or grooves along such sides or along such impervious bottom, while the diaphragm E, by reason of its downwardly-decreasing diameter and the pressure exerted upon the same, tends to hug the filtering material more closely than in a vessel whose walls are straight or cylindrical. This will appear obvious when it is seen that a force of, say, five hundred pounds to the square inch, if necessary, could be applied outside of the said diaphragms, while the force required for the filtration of the liquid through the filtering material may be very much less, say, from fifty to two hundred pounds. In this figure (2) I have shown the diaphragms E and F attached to the side walls of the vessel A, and as made liquid-tight by means of a packing-ring, $u$, and pins or screws $v$. It will thus be seen that in this figure (2) there are three entirely separate diaphragms, (forming three non-communicating chambers or passage-ways,) and that by means of the three pipes or orifices $r$ $r$ $r$ the required pressure can be exerted upon any one, any two, or upon all of the said diaphragms, and that different pressures can be exerted upon the different diaphragms, as found expedient. It is, of course, obvious that more than three diaphragms or chambers, with accompanying gages and safety-valves, may be used, if desired. In this figure (2) it will be seen that the plates K and L are dispensed with, the diaphragm D resting immediately upon the filtering material, and in this case I have shown the mouth of the pipe $k$ covered with wire-gauze or other suitable material $w$.

In some cases it may be found desirable to leave a chamber or passage-way for the easy flow of the liquid, steam, or air between the diaphragms E and F, either or both, and the filtering-vessel. In Fig. 3 I have shown an example of doing this by means of the interposition of, say, wire-cloth T. It is, of course, obvious that if the cover B were flattened or concaved the medium T could be interposed between said cover and diaphragm D.

In Fig. 4 I have shown the diaphragms D, E, and F, as composed of rigid material, as, for instance, iron plates, attached to which I have shown elastic, pliable, or flexible liquid-tight hinges or joints $x'$, $y$, and $z$, and the joints or hinges $x'$ and $y$ as also forming the packing between the cover and vessel flanges $b$ and $d$. In this figure (4) I have shown india-rubber U surrounding the diaphragm E, and also springs V interposed between the impervious diaphragm F and the vessel A. And I have also shown the outlet-pipe H as being in two parts and joined by a liquid-tight hinge or joint, $H'$. The pipe H, as well as the pipe $k$, could, of course, be made of elastic, flexible, or yielding material, or so constructed or otherwise arranged as to be movable or adjustable, say, by a suitable packing-box. It will thus be seen that, when packing the filtering material C, the said india-rubber U and springs V will become compressed, and then in the operation of filtration they will constantly tend to expand, thus pressing the diaphragms E and F against the said filtering material. The flexible joint or hinge H' would, of course, give play to the diaphragm F. For the support or keeping in place of the india-rubber U, or other compressible material, I have shown a ring or pins, $o^2$. The springs V and rubber U not only assist the pressure exerted through the feed-pipes $r\ r$, but they also tend to keep the diaphragms pressed against the filtering material in the case of letting off the pressure exerted through said pipes $r\ r$. It is obvious that any of the diaphragms D, E, or F may, as found desirable, be compressed by means of springs, rubber, or other compressing mechanism, as will be understood by reference to Patent No. 171,055, granted me December 14, 1875. In this figure (4) I have shown a perforated or permeable cap or device, I, communicating with the outlet pipe or orifice H, and extending into the filtering material. This cap or device I, when filtering inwardly, forms a receptacle or receiver for the filtered liquid before leaving the filtering-chamber, and this receiver I may be made, composed, or constructed of any suitable substance or material, or formed or constructed in any manner whereby, when filtering inwardly, the filtered liquid will be caused or permitted to flow to it or within it, and it may be of any suitable size or shape, and be wholly or partly perforated or permeable, having, if desired, an impervious wall or portion adjacent to the diaphragm F, and it may extend into the filtering material for a greater or less distance, all as found desirable.

In Fig. 5, which is a plan view on the line $x\ x$ of Fig. 4, I have shown the diaphragm E in sections, which sections are joined by liquid-tight elastic pliable or flexible hinges or joints $y'$, by means of which hinges or joints the rigid plates or diaphragms E E E are allowed to be compressed against the filtering material. These joints $y'$ can, of course, be inside or outside of the diaphragm E, or made in any other suitable manner, as desired.

In Fig. 6 I have shown the diaphragm E as carrying ledges, shelves, or deflectors $h'\ i'$. It is, of course, obvious that any of the diaphragms may carry ledges or deflectors and counter ledges or deflectors, as found expedient, and that they may be made or constructed in any suitable manner, as will appear evident by reference to Patents No. 163,814, granted to me May 25, 1875, No. 165,377, granted to me July 6, 1875, No. 169,857, granted to me November 9, 1875, and No. 171,056, granted to me December 14, 1875; and the operation of these ledges $h'\ i'$ and counter-ledges will be understood by reference to the said patents.

I will here remark that while in Figs. 1 and 4 I have shown communication between the chambers E' and F', it is obvious that communication could, if desired, be also established between the chambers E' and D' by means, say, of a pipe or tube connecting, and made liquid-tight, with the said diaphragms E and D, and thus the same external pressure could be exerted upon all parts of the filtering material; or, after packing the filtering-chamber, the diaphragms E and D could be joined by means of, say, packing-rings and pins or screw-bolts, and a suitable packing could be interposed between the cover and vessel flanges $b\ d$. (See Figs. 7 and 8.)

And I will also remark that the operation of the said diaphragms E and F would be the same in an open vessel as in a closed vessel, and that if the cover B were dispensed with, and the diaphragm D employed, the said diaphragm D could be compressed in any suitable manner, as will be understood by reference to the before-mentioned Letters Patent No. 171,055, granted me December 14, 1875.

And I will here state that by making the diaphragms D, E, or F of a material or substance which will resist the action of steam or hot fluid, the said steam or fluid, besides compressing the said diaphragms, would also serve the purpose of keeping the liquid or filtering material in the filtering-chamber in a heated state, and for the purpose of drawing off any liquid or steam from the chambers D, E, or F suitable draw-off cocks could be used.

While it is obvious that but one pump or pressure-producing medium need be used, and that the feed or pressure pipes or orifices $k\ r$ could be arranged in any suitable manner, and enter the vessel at any desired point, I will also remark that, instead of using safety, overflow, spring, or other governing valve or valves, the pressure upon the liquid to be filtered, and also the pressure upon the diaphragms D E F, any or all, could be adjusted to any required degree, simply by turning the stop-cocks so as to govern the supply passing through said pipes or orifices $k\ r$.

And although I have described and shown the apparatus in the several figures as working from the top toward the bottom, yet it is obvious that the liquid to be filtered could be injected or fed through the pipe H, and discharged through the pipe $k$.

In Figs. 1, 2, and 4 I have shown the diaphragm F or bottom wall of the filtering-chamber as not only being flexible or movable in such manner as to conform to the filtering material, but also as having an impervious surface between its orifice or outlet and its junction with the side wall or diaphragm E, thus obliging any liquid at or near the junction of said walls or diaphragms to percolate the filtering material lying adjacent to said wall or diaphragm F before reaching the said orifice or outlet.

And it will be obvious (referring to Fig. 4) that by constructing the diaphragm or wall E, or side wall (or walls) of a filtering chamber or vessel wholly or partially of some elastic, yielding, or flexible substance, in packing the filtering material the said diaphragm or wall will stretch, yield, or become lengthened, and then, in the operation of filtration, will tend to contract, and thus longitudinally press or compact the said filtering material. Another way to accomplish this would be to have the said wall (or walls) of the filtering chamber or vessel rigid and constructed in sections, the same being made movable by suitable hinges or joints, (as, for example, see H H', Fig. 4;) or the said sections may be made to slide past or to overlap each other, or to work one within the other, and may be provided with suitable liquid-tight joints, hinges, or packing.

I do not claim the fixed impermeable flexible diaphragm D in a vessel for filtering liquids under pressure, either alone or in combination with the movable or adjustable diaphragms K and L, or with means by which different degrees of pressure are exerted on opposite sides of the said diaphragm.

What I claim as new, and desire to secure by Letters Patent, is—

1. The combination of the movable or adjustable diaphragm F, one or more, with or without the movable or adjustable diaphragms D E, either or both, and a filtering-vessel, substantially as and for the purposes herein specified.

2. The combination of the movable or adjustable diaphragm E, one or more, with or without the movable or adjustable diaphragm D, and a filtering-vessel, substantially as and for the purposes herein specified.

3. The combination of the movable or adjustable diaphragms D E F, any or all, with a conical or tapering filtering-vessel, substantially as and for the purposes herein specified.

4. The combination, with a filtering-vessel and the movable or adjustable diaphragms E F, either or both, of the pipe or pipes r, with or without the pump P, or other pressure-producing medium, the latter with or without the pressure-gage R and safety-valve S, either or both, substantially as and for the purposes herein set forth.

5. The combination, with a filtering-vessel, of the movable or adjustable diaphragms D E F, either or both of the latter, and differential forcing apparatus, substantially as herein specified.

6. The combination, with a filtering-vessel, of the chambers or passage-ways D' E' F', so arranged or constructed as to establish communication between all of the said chambers or passage-ways, substantially as and for the purposes herein specified.

7. The combination, with a filtering-vessel and a movable or adjustable liquid-tight diaphragm, of the passage or chamber medium T, substantially as and for the purposes herein specified.

8. The combination, with a filtering-vessel or chamber, of the movable or adjustable diaphragms or walls D E F, any or all, and the joints or hinges $x'$, $y$, and $z$, respectively, substantially as and for the purposes herein specified.

9. The combination, with a filtering-vessel or chamber, of the diaphragm E and the hinges or joints $y'$, one or more, substantially as and for the purposes herein specified.

10. The combination, with a filtering-vessel, of a flexible or movable feed or exit pipe, and a movable or adjustable diaphragm, D, E, or F, substantially as and for the purposes herein specified.

11. The combination, with a filtering-vessel, of the movable or adjustable liquid-tight diaphragms D E F, any or all, and spring or other mechanism for compressing the same, substantially as and for the purposes herein specified.

12. The combination, with a filtering-vessel, of the movable or adjustable diaphragms D E F, any or all, and ledges, shelves, or deflectors, with or without counter ledges or deflectors, substantially as and for the purposes herein specified.

13. The combination, with a filtering chamber or vessel, of a movable or adjustable bottom wall or diaphragm, provided with an impervious or liquid-tight surface surrounding its orifice or outlet, substantially as and for the purposes herein specified.

14. The combination, with a filtering vessel or chamber, of a longitudinally flexible or movable wall or walls or diaphragm, E, substantially as and for the purposes herein specified.

THOS. R. SINCLAIRE.

Witnesses:
WM. F. PICKETT,
WM. C. CARPENTER.